(12) United States Patent
Tucker et al.

(10) Patent No.: US 10,728,324 B2
(45) Date of Patent: Jul. 28, 2020

(54) SELECTIVE SERVER-SIDE EXECUTION OF CLIENT-SIDE SCRIPTS

(71) Applicant: ServiceNow, Inc., Santa Clara, CA (US)

(72) Inventors: Christopher Tucker, San Diego, CA (US); Kyle Barron-Kraus, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 76 days.

(21) Appl. No.: 15/583,387

(22) Filed: May 1, 2017

(65) Prior Publication Data

US 2018/0316757 A1    Nov. 1, 2018

(51) Int. Cl.
*H04L 29/08* (2006.01)
*H04L 29/06* (2006.01)
*G06F 16/958* (2019.01)

(52) U.S. Cl.
CPC ........ *H04L 67/1095* (2013.01); *G06F 16/958* (2019.01); *H04L 67/02* (2013.01); *H04L 67/325* (2013.01); *H04L 67/42* (2013.01)

(58) Field of Classification Search
CPC .. G06F 17/30905; G06F 21/51; G06F 17/218; G06F 17/24; G06F 8/30; G06F 8/33; G06F 8/443; G06F 8/71; G06F 9/44578; G06F 16/958; H04L 63/0281; H04L 63/20; H04L 67/1095; H04L 67/07; H04L 67/42; H04L 67/02; H04L 67/325
See application file for complete search history.

(56) References Cited

U.S. PATENT DOCUMENTS

| | | | | |
|---|---|---|---|---|
| 8,209,704 B1 * | 6/2012 | McCann | ................. | G06F 9/545 711/130 |
| 8,447,851 B1 * | 5/2013 | Anderson | ........... | G06F 11/3006 709/223 |
| 8,914,774 B1 * | 12/2014 | Colton | ................ | G06F 9/44578 709/203 |
| 8,938,491 B1 * | 1/2015 | Colton | ..................... | G06F 9/54 709/203 |

(Continued)

OTHER PUBLICATIONS

Client-Side Scripting: Javascript, Chapter 9, Jan. 28, 2013, downloaded from http://www.cs.kent.edu/~svirdi/Ebook/wdp/ch09.pdf Apr. 21, 2017.

*Primary Examiner* — Todd L Barker
(74) *Attorney, Agent, or Firm* — Fletcher Yoder PC

(57) ABSTRACT

An example embodiment may involve receiving, by a web server device and from a client device, a request for web content. The example embodiment may also involve determining, by the web server device, that a web document includes a script containing a synchronous client-side function call matching pre-determined criteria. The web content may be at least in part derivable from the web document. The example embodiment may also involve executing, by the web server device, the synchronous client-side function call to obtain output data. The example embodiment may also involve modifying, by the web server device, the web document to include the output data in a data structure associated with the synchronous client-side function call. The example embodiment may also involve transmitting, by the web server device and to the client device, the web document as modified.

20 Claims, 11 Drawing Sheets

(56) References Cited

U.S. PATENT DOCUMENTS

| | | | | |
|---|---|---|---|---|
| 9,170,928 | B1* | 10/2015 | Dantkale | G06F 12/0223 |
| 9,798,524 | B1* | 10/2017 | Colton | G06F 8/31 |
| 2013/0013859 | A1* | 1/2013 | Zhu | G06F 17/30902 |
| | | | | 711/118 |
| 2013/0185643 | A1* | 7/2013 | Greifeneder | H04L 67/22 |
| | | | | 715/736 |
| 2016/0077901 | A1* | 3/2016 | Roth | G06F 9/45529 |
| | | | | 719/328 |
| 2017/0012843 | A1* | 1/2017 | Zaidi, III | G06Q 20/382 |
| 2017/0083486 | A1* | 3/2017 | van der Horst | H04L 63/20 |

* cited by examiner

```
<script>
var g_event_handlers_localCache = {};  ← 720 function onLoad() {                     ← 722
    console.log("Caller's name is " + g_form.getReference('caller_id').name);
} g_event_handlers_localCache['caller_id'] = {"calendar_integration":"1", "country":"",
"user_password":"yvMi8Lvtch6sSja/ev8RAwefryU=", "last_login_time":"",                        ← 724
"last_login_device":"", "source":"", "sys_updated_on":"2012-02-25 21:17:20",
"building":"", "web_service_access_only":"false", "notification":"2",
"sys_updated_by":"admin", "sys_created_on":"2004-07-03 18:26:05", "sys_domain":"global",
"state":"", "vip":"false", "sys_created_by":"admin", "zip":"", "home_phone":"",
"time_format":"", "accumulated_roles":"START,END", "last_login":"",
"default_perspective":"", "active":"true", "last_password":"", "sys_domain_path":"/",
"transaction_log":"", "cost_center":"7fb1cc99c0a80a6d30c04574d14c0acf", "phone":"",
"name":"Joe Employee", "employee_number":"", "password_needs_reset":"false",
"gender":"Male", "city":"", "failed_attempts":"", "user_name":"employee",
"edu_status":"", "roles":"", "title":"Administrative Assistant",
"sys_class_name":"sys_user", "sys_id":"681ccaf9c0a8016400b98a06818d57c7",
"internal_integration_user":"false", "ldap_server":"", "mobile_phone":"", "street":"",
"company":"31bea3d53790200044e0bfc8bcbe5dec",
"department":"221db0edc61122840l760aec06c9d929", "first_name":"Joe",
"email":"employee@example.com", "introduction":"", "preferred_language":"", "manager":"",
"locked_out":"false", "sys_mod_count":"9", "last_name":"Employee", "photo":"",
"middle_name":"", "time_zone":"", "schedule":"", "correlation_id":"", "date_format":"",
"location":"25ab9ddd0a0a0bb3003572b22b3b4e55"};
</script>
```

FIG. 7B

SELECTIVE SERVER-SIDE EXECUTION OF CLIENT-SIDE SCRIPTS

BACKGROUND

Web transactions may involve a web server device transmitting a web document to a client device. The web document may be formatted in accordance with a markup language, such as the HyperText Markup Language (HTML). The web document may define static content and how this static content should be presented on a web page rendered by the client device. In some cases, parts of the web page are not known until the web document is about to be transmitted to the client device or after this transmission takes place. Therefore, markup languages may also support dynamic content through embedded client-side scripts. These scripts may be delivered to the client device as part of the web document, and may be executed by a web browser on the client device. Such execution may result in the client device carrying out function calls, some of which may cause the client device to transmit requests for and receive the dynamic content from the web server device or other devices. In this fashion, dynamic content can be combined with the static content of the web document, facilitating more flexibility in the types of information that can be provided to client devices.

Nonetheless, client-side scripting may subject the overall web transaction to additional latency. Each time the client device executes a script that involves retrieving dynamic content over a network, the client device may wait for this content to arrive before it can be incorporated into the rendered web page. This delay may involve a round-trip time (RTT) of network propagation delay between the client device and the device providing the information, as well as processing delay at the latter device. Further, some client-side architectures block on such client-side requests (i.e., the client-side application waits for each request to complete before performing other requests or other operations), resulting in these requests being carried out serially. As a consequence, users may become frustrated with the amount of time that they have to wait for web content to load, while server devices are subjected to the overhead of serving multiple client-side requests per web document.

SUMMARY

The embodiments herein allow a web server device to selectively execute client-side scripts instead of requiring that the client device do so. Particularly, the web server device may identify client-side scripts embedded in a web document before transmitting the web document to the client device. For client-side scripts that match certain pre-determined criteria (e.g., the scripts contain one or more function calls that would result in the client device making a request to the web server device), the web server device may perform the operations of the function call itself. In this way, the resulting information can be embedded into the web document, and the client device does not have to execute the function call. Consequently, client-side processing occurs more rapidly, as the web browser does not have to wait for the function call to return. Also, there is less of a computational burden on the web server device, as it can perform the function call directly rather than having to process the overhead of an additional request from the client device.

While the discussion herein focuses on synchronous function calls, the disclosed embodiments may operate on asynchronous function calls or any other type of function call.

Accordingly, a first example embodiment may involve receiving, by a web server device and from a client device, a request for web content. The first example embodiment may also involve determining, by the web server device, that a web document includes a script containing a synchronous client-side function call matching pre-determined criteria. The web content may be at least in part derivable from the web document. The first example embodiment may also involve executing, by the web server device, the synchronous client-side function call to obtain output data. The first example embodiment may also involve modifying, by the web server device, the web document to include the output data in a data structure associated with the synchronous client-side function call. The first example embodiment may also involve transmitting, by the web server device and to the client device, the web document as modified.

A second example embodiment may involve transmitting, by a client device and to a web server device, a request for web content. The second example embodiment may also involve receiving, by the client device and from the web server device, a web document, wherein the web content is derivable at least in part from the web document. The second example embodiment may also involve determining, by the client device, that the web document includes a script containing a synchronous client-side function call, the output of which is contained within a data structure included in the web document. The second example embodiment may also involve generating, by the client device, the web content from the web document. The output of the synchronous client-side function call may be used in the web content instead of the client device executing the synchronous client-side function call. The second example embodiment may also involve rendering, by the client device and on a display unit of the client device, the web content.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B is a modified client-side script, in accordance with example embodiments.

DETAILED DESCRIPTION

Figure 1:
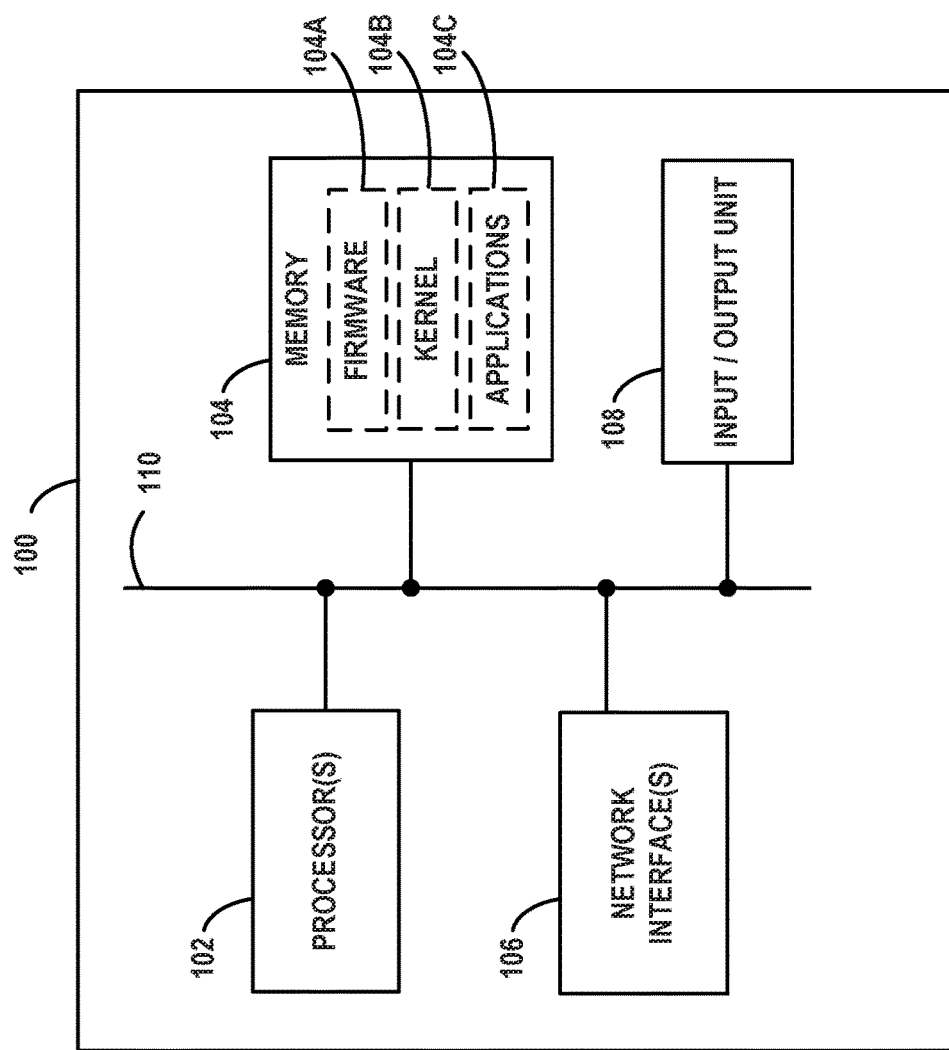
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
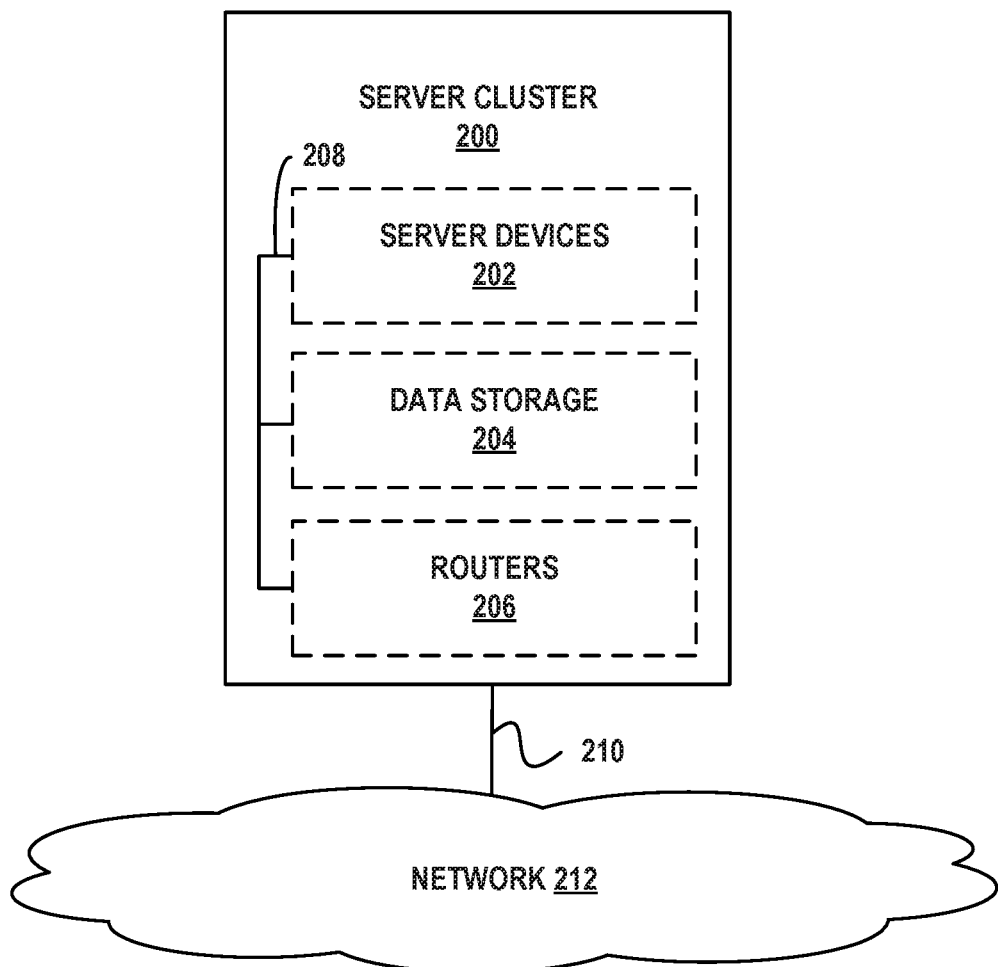
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
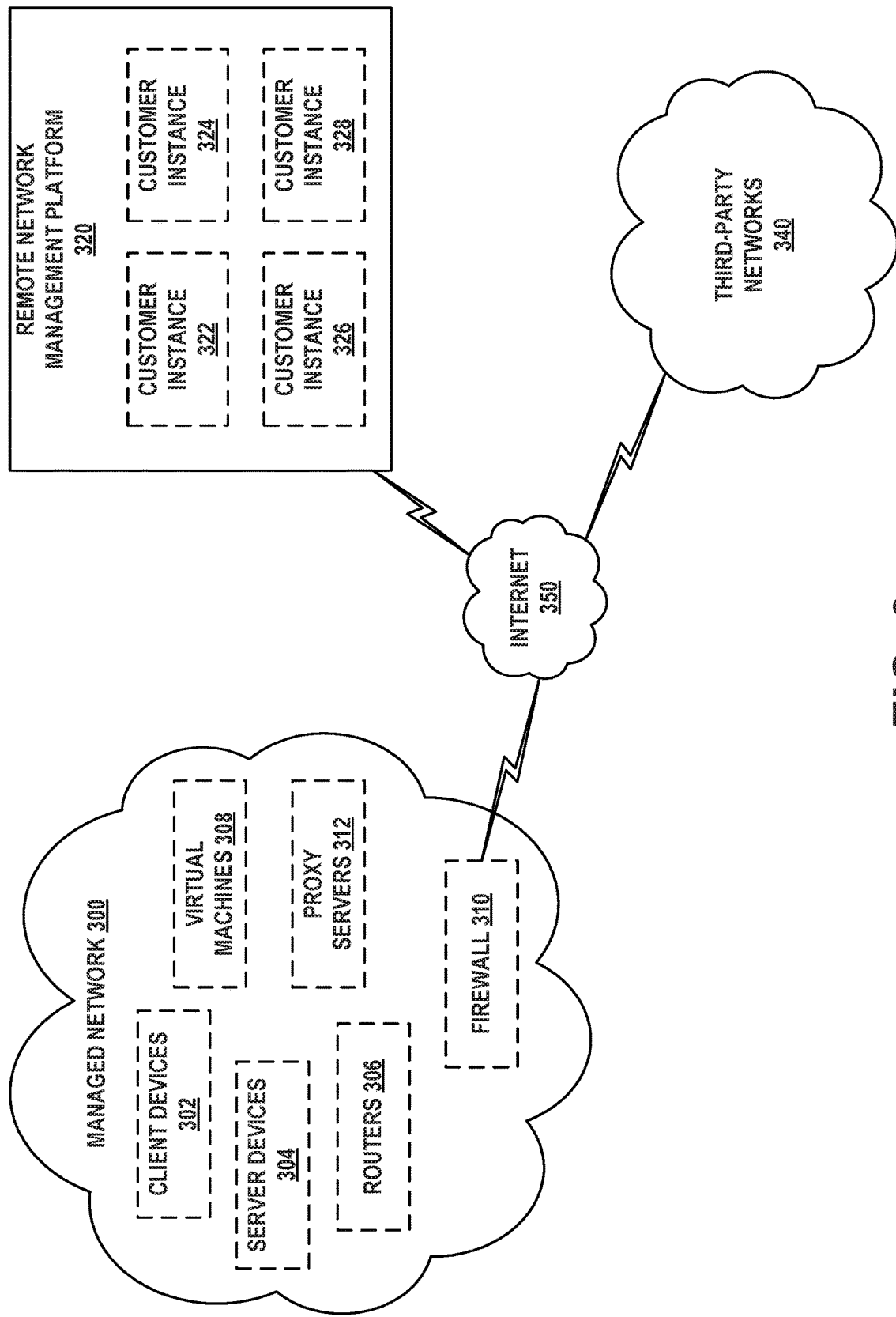
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
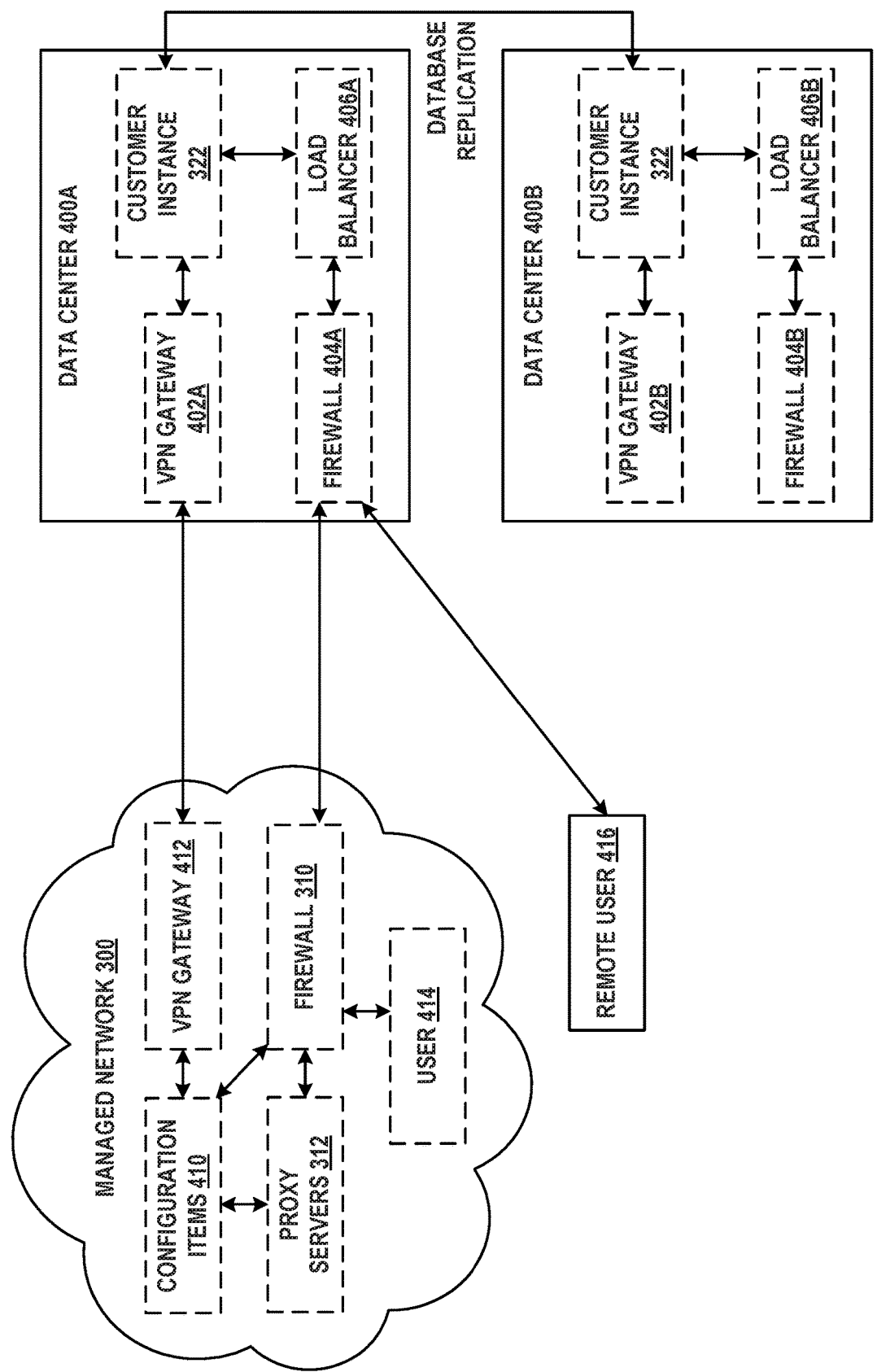
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
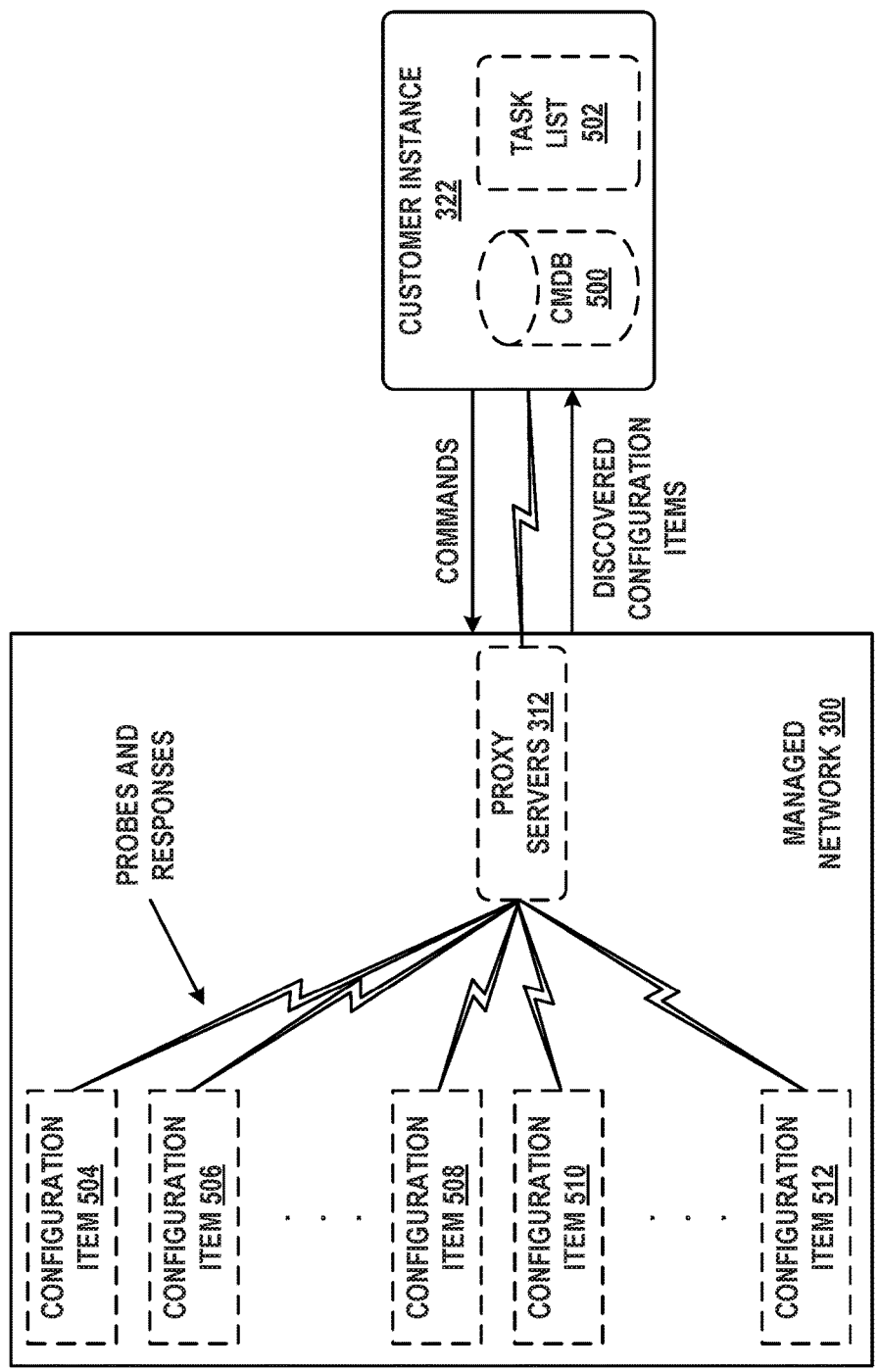
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
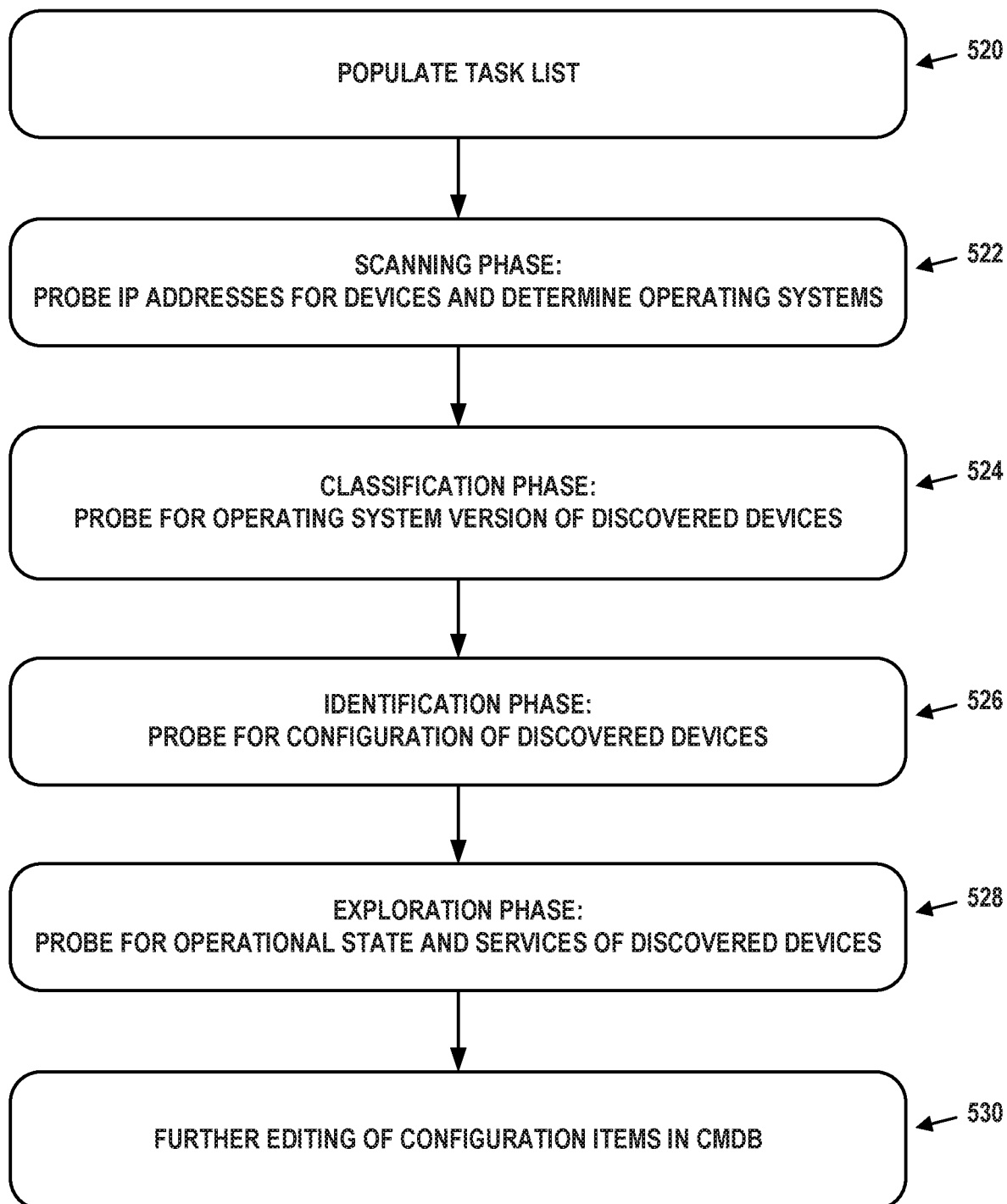
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Web Transactions

Web transactions typically involve a client device transmitting a request for web content (e.g., a web page) to a web server device. More particularly, a web browser application executing on the client device may transmit the request in accordance with the HyperText Transport Protocol (HTTP) to a web server application executing on the web server device. The client device may be exemplified by computing device 100, while the web server device may be exemplified by computing device 100 or server cluster 200. However, other possibilities exist.

The request may identify the web content, at least in part, by way of a Uniform Resource Locator (URL). The URL may be a character string that specifies a particular web document available by way of the web server device. In response to receiving the request, the web server device may identify the web document.

The web document may take various forms, one of which is that of an HTML file. This file may contain a combination of content (e.g., text and data), markup (embedded delimiters that specify how the content is to be organized or displayed), and scripts. With respect to the scripts, these may be either server-side or client-side, depending on whether they are intended to be executed by the web server device or the client device.

Server-side scripts may be, for instance, PHP HyperText Preprocessor (PHP) scripts that are executed by the web server device to generate HTML (or other content) that is then embedded in the web document before the web server transmits the web document to the client device. PHP scripts may contain function calls to a database so that parts of the web document can be dynamically generated. The database may reside upon the web server device or on another device accessible to the web server device.

Client-side scripts, on the other hand, may be snippets of JavaScript code that are executed by the client device after the client device receives the web document. Depending on their purpose, these scripts may be executed before or after the web document is rendered by the client device into a web page. In some cases, client-side scripts may be executed after the rendering of a web page in order to make the web page more dynamic. These scripts may respond to user-based events, such mouse-click or mouse-over events to assist with page navigation or to display additional information on the web page. Client-side scripting has led to the concept of a "single-page application," in which a web document contains enough dynamic client-side functionality to effectively behave like an application.

While client-side scripting was initially intended to distribute processing between client devices and web server devices such that the burden on web server devices is reduced, new ways of using client-side scripts can instead cause the server-side processing burden to be increased. In particular, Asynchronous JavaScript and XML (AJAX) technologies allow client-side scripts to make dynamic requests to the web server device.

As an example, the XMLHttpRequest (XHR) application programming interface (API) is supported by most web browsers and web servers. XHR allows client-side scripts to dynamically request content from web server devices so that rendered web pages can be modified. In some cases, a web document may contain a number of client-side scripts that, in combination, include a dozen or more XHR function calls. Each of these function calls may involve a separate transaction between the client device and the web server device. Given that a large number of XHR function calls can exist in a web document, the number of discrete requests that a web server device is subjected to per web document can be similarly large. Consequently, this can dramatically increase the processing burden on the web server device.

Furthermore, when multiple XHR function calls are made sequentially, these function calls may effectively be synchronous in nature—that is, the client device may be unable to carry out a subsequent function call until the current function call completes. This results in web page loading operations to be slower on the client device, which may lead to user frustration and impatience.

The embodiments herein improve upon the state of the art and overcome these limitations by allowing a web server device to identify certain XHR-like function calls in client-side scripts. The web server device may execute these function calls prior to transmitting the web document to the client device. After executing these scripts, the web server device embeds the results thereof into a data structure appended to the web content. Each function call may be associated with a reference into the data structure that identifies the function call's respective results. Upon receiving the web document, the client device may use each reference to identify the corresponding section of the data structure, and use the content therein instead of executing the client-side script.

As a result, the communication and computational burden on the web server device is reduced as the number of transactions per web page is decreased. Notably, the overhead of executing the client-side scripts on the web server device prior to transmission of the web document has been found to be less than that of the web server device receiving numerous individual requests resulting from client-side execution. Furthermore, the user experience is improved because the web content can be obtained and displayed more rapidly.

While the discussion of web transactions herein are generally focused on a client-server model in which a web server device provides a web document for rendering and display on a display unit (e.g., a screen) of a client device, other models are possible. The embodiments herein may also be able to improve transactions using web-based protocols even if the client device does not render the resulting web content for display. Thus, these embodiments may be applicable to machine-to-machine communications, as well as other types of transactions. Furthermore, while the discussion herein focuses on synchronous function calls, the disclosed embodiments may operate on asynchronous function calls or any other type of function call.

The aPaaS system described in FIGS. 3-5A may be a particularly suitable candidate for deploying these embodiments because it may make heavy use of web transactions with client-side scripting. Particularly, one or more server devices disposed within customer instance 322 may provide web-based interfaces that allow users in managed network 300 and elsewhere to view the configuration and operational conditions of managed network 300. From this interface, users may be able to trigger discovery procedures, view network and device status, and carry out higher-level procedures (e.g., managing IT, HR, and finance operations). Nonetheless, the embodiments herein may be used to enhance any web transaction with client-side scripts that make function calls to the web server device.

Figure 6:
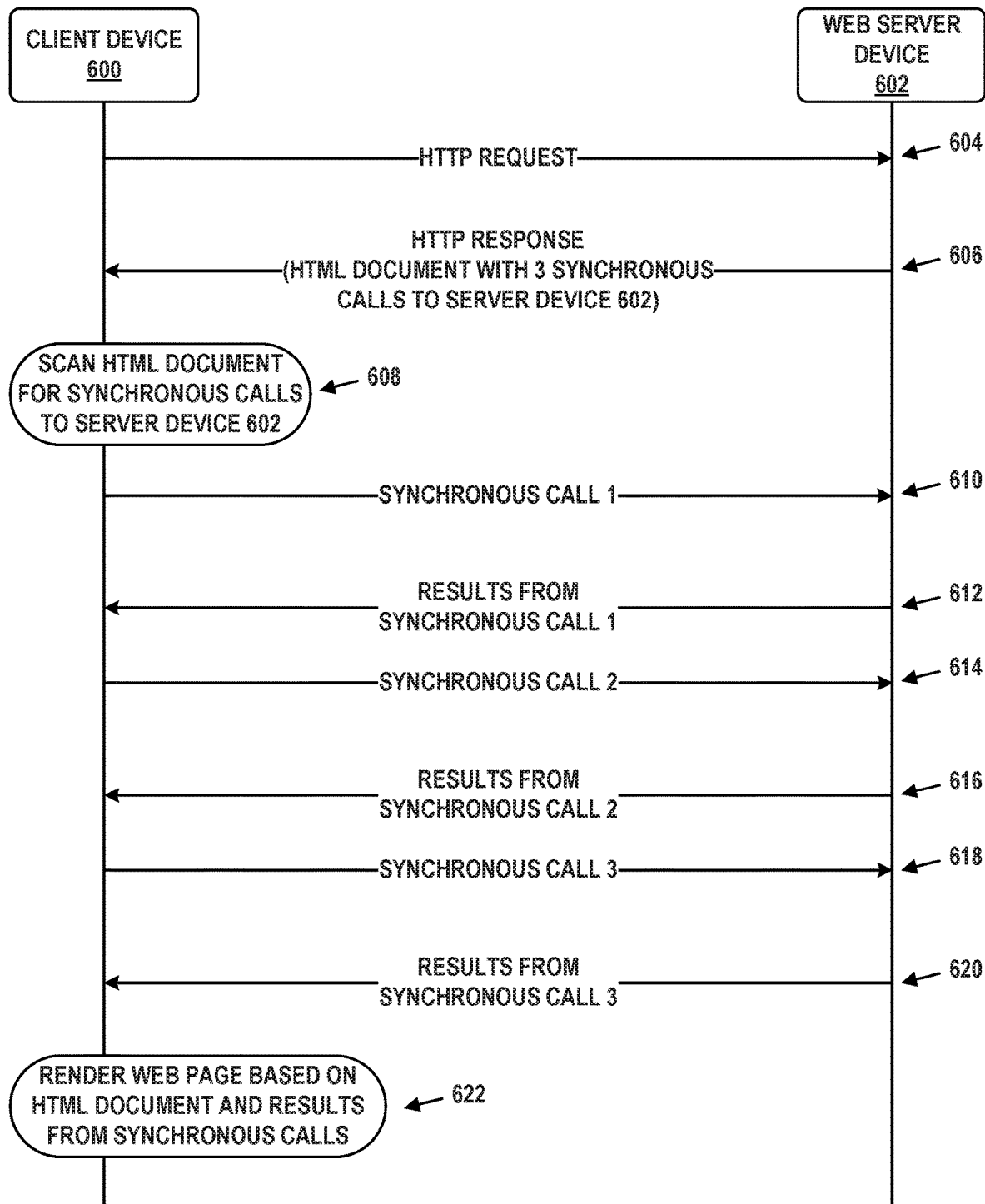
FIG. 6 is a message flow diagram, in accordance with example embodiments.

To further appreciate the extent of the improvements provided by these embodiments, FIG. 6 depicts a traditional web transaction with client-side scripting. In FIG. 6, client device 600 carries out the transaction with web server device 602.

At step 604, client device 600 may transmit an HTTP request to web server device 602. The HTTP request may identify an HTML document accessible to web server device 602 that contains three synchronous function calls to web server device 602. At step 606, web server device 602 transmits an HTTP response to client device 600. The HTTP response may include the HTML document.

After receiving the HTML document, at step 608 client device 600 may scan the HTML document for synchronous function calls. This scanning may take place before or after at least part of the HTML document is rendered for display on client device 600. Regardless of when it happens, the scanning may result in client device 600 identifying the three synchronous function calls. In some embodiments, "scanning" may refer to identifying relevant function calls during execution of the script in which they are contained.

As an example, one of these scripts may contain the following code:

```
<script>
function onLoad( ) {
    console.log("Caller's name is " +
    g_form.getReference('caller_id').name);
}
</script>
```

This code is a simplified example of the type of synchronous function call that may be embedded in a script. The onLoad( ) function calls the g_form.getReference( ) function, which is a synchronous function call to the web server device that provided this script. Particularly, g_form.getReference( ) requests a record from a database that is associated with the caller_id index. Thus, the call to g_form.getReference( ) causes the client device to transmit a request for this record to the web server device, and the web server device to respond with the entire record. From this record, the name field is used. The function onLoad( ) also calls the console.log( ) function, which in turn is configured to write output from the g_form.getReference( ) call to a web browser's console.

At step 610, client device 600 may execute the first synchronous function call ("synchronous call 1"). In doing so, client device 600 may transmit a request for further content to web server device 602. In response to receiving this request, web server device 602 may obtain the requested content (e.g., from a database). At step 612, web server device 602 may provide this content ("results from synchronous call 1") to client device 600. Client device 600 may then render the content as part of any web page rendered from the HTML document. Alternatively, client device may wait until further synchronous function calls complete before rendering the content.

Similar procedures may be carried out for the second synchronous function call ("synchronous call 2") and the third synchronous function call ("synchronous call 3"). Particularly, at step 614, client device 600 may execute the second synchronous function call and transmit a request for further content to web server device 602. At step 616, web server device 602 may provide this content ("results from synchronous call 2") to client device 600. At step 618, client device 600 may execute the third synchronous function call and transmit a request for further content to web server device 602. At step 620, web server device 602 may provide this content ("results from synchronous call 3") to client device 600.

At step 622, client device 600 render at least part of a web page based on the HTML document and the additional content retrieved during steps 610-620. As noted above, some of this web page may have been rendered previously.

FIG. 6 illustrates some of the drawbacks associated with client-side scripts that make function calls to a web server device. To obtain all of the necessary content, client device 600 and web server device 602 undertake four separate transactions. Further, client device 600 carries out these transactions sequentially, causing final rendering of the web page to be slower than it otherwise could be. For example, if the RTT between client device 600 and web server device 602 is 75 milliseconds, there will be 300 milliseconds of delay associated with the overall procedure of FIG. 6 before any processing latency of web server device 602 is taken into account.

Figure 7A:
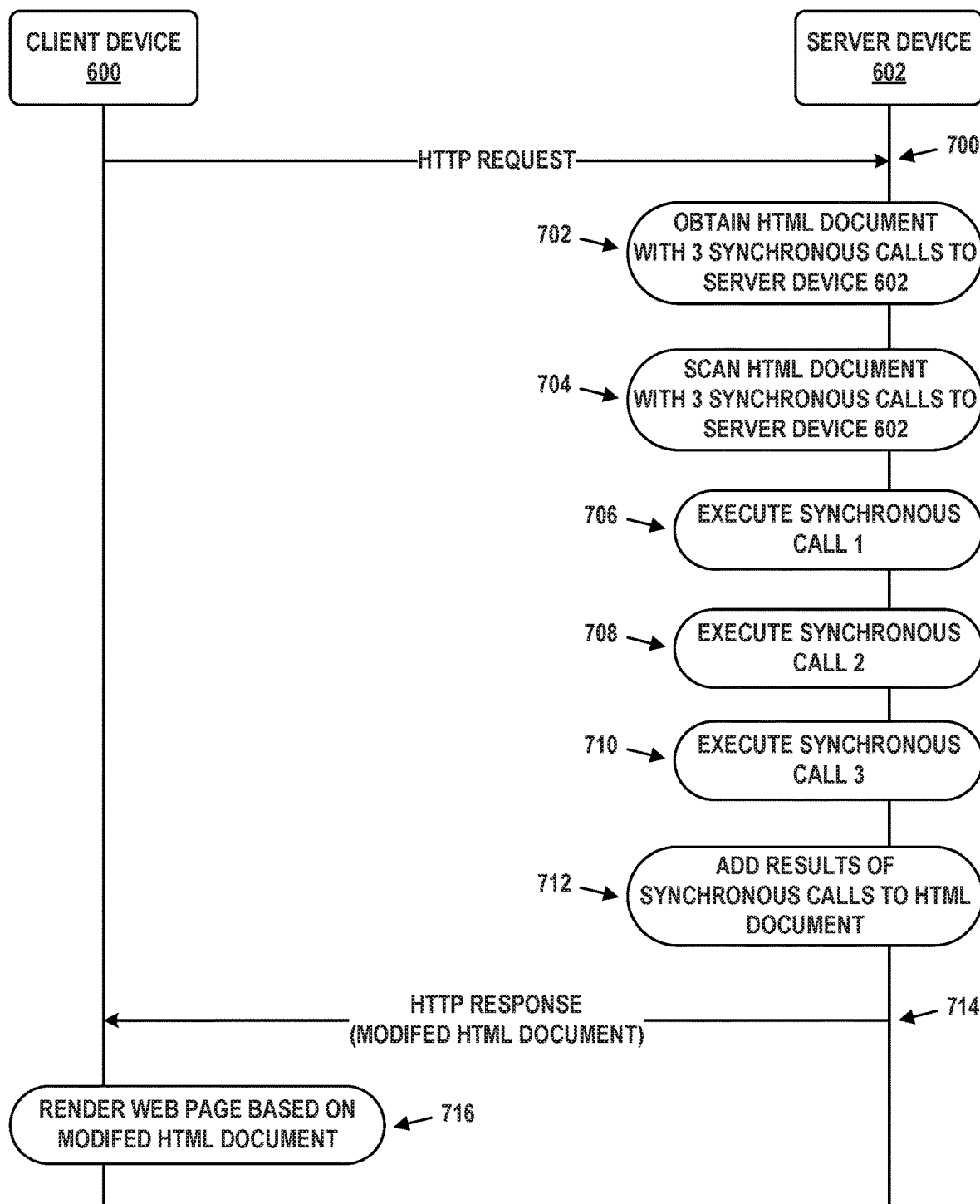
FIG. 7A is a message flow diagram, in accordance with example embodiments.

In order to overcome these limitations, embodiments in accordance with FIG. 7A may be deployed. At step 700, client device 600 may transmit an HTTP request to server device 602. This may be analogous to the HTTP request of step 604. Thus, the HTTP request may identify an HTML document accessible to web server device 602 that contains three synchronous function calls to web server device 602.

At step 702, web server device 602 may obtain this document. At step 704, web server device 602 may scan this document to identify certain synchronous function calls therein. This scanning may take place as the document is being compiled or after document compilation (to the extent that it occurs) is completed. Notably, web server device 602 may attempt to identify synchronous function calls matching one or more criteria.

For instance, the synchronous function calls that web server device 602 may scan for may be a particular function call, a particular type of function call, or function calls matching a particular function call signature. A particular function call may be, for example, the g_form.getReference( ) function call discussed above. A particular type of function call may include a family or set of related function calls that all involve transmitting synchronous requests to web server device 602. For either of a particular function call or a particular type of function call, web server device 602 may be pre-configured with definitions matching these criteria. For a particular function call signature, the criteria may include the general format of the function call as well as the form or content of its parameters. As an example, a regular expression could be used to define a function call format that matches the criteria. In all of these cases, web server 602 may seek to identify client-side function calls that it can execute, as defined by the criteria.

In any event, at step 704, web server device 602 finds three synchronous function calls in the HTML document. At steps 706, 708, and 710, respectively, web server device 602 executes these function calls. At step 712, web server device 602 includes the results of these function calls in the HTML document, thus modifying this document.

At step 714, web server device 602 transmits the modified HTML document to client device 600, as an HTTP response to the HTTP request of step 700. At step 716, client device 600 may render a web page based on the modified HTML document. To do so, client device 600 may use the results of the function calls as included in the modified HTML document in place of executing these function calls.

FIG. 7B provides a simplified example of a modified HTML document. This document is abbreviated to just include a script. The actual modified HTML document may contain HTML markup, content, and other scripts. Particularly, the onLoad( ) function 722 is the same as that of the example above, and is in the original HTML document. Web server device 602 may have added the declaration 720 of the g_event_handlers_localCache variable, as well as the assignment 724 to the caller_id index of this variable.

Particularly, after web server device 602 identifies the g_form.getReference( ) function as matching the criteria for server-side execution, web server device 602 adds declaration 720 to the HTML document, executes the g_form.getReference( ) function to obtain its output, and places this output in assignment 724 as a series of key-value pairs.

After client device 600 receives the modified HTML document, client device 600 executes onLoad( ) function 722. As a consequence, client device 600 also executes the g_form.getReference( ) function. But in this scenario, as part of executing this function, client device 602 is configured to look for declaration 720. If it exists, then client device 602 looks in assignment 724 (because this assignment is indexed by the caller_id value that is passed as a parameter to the g_form.getReference( ) function). Specifically, client device 602 dereferences the name key, which is associated with the value "Joe Employee". The latter is used as output for the g_form.getReference( ) function.

In some embodiments, until the web page is fully rendered, client device 600 may continue to use assignment 724 in place of making additional synchronous function calls to web server device 602. Once the web page is fully rendered, client device 600 may delete or otherwise invalidate assignment 724 to limit the risk of future synchronous function calls obtaining stale data therefrom. This invalidation may occur after expiration of a pre-defined time period, such as one or more seconds or minutes from the completion of rendering.

VI. Example Operations

Figure 8:
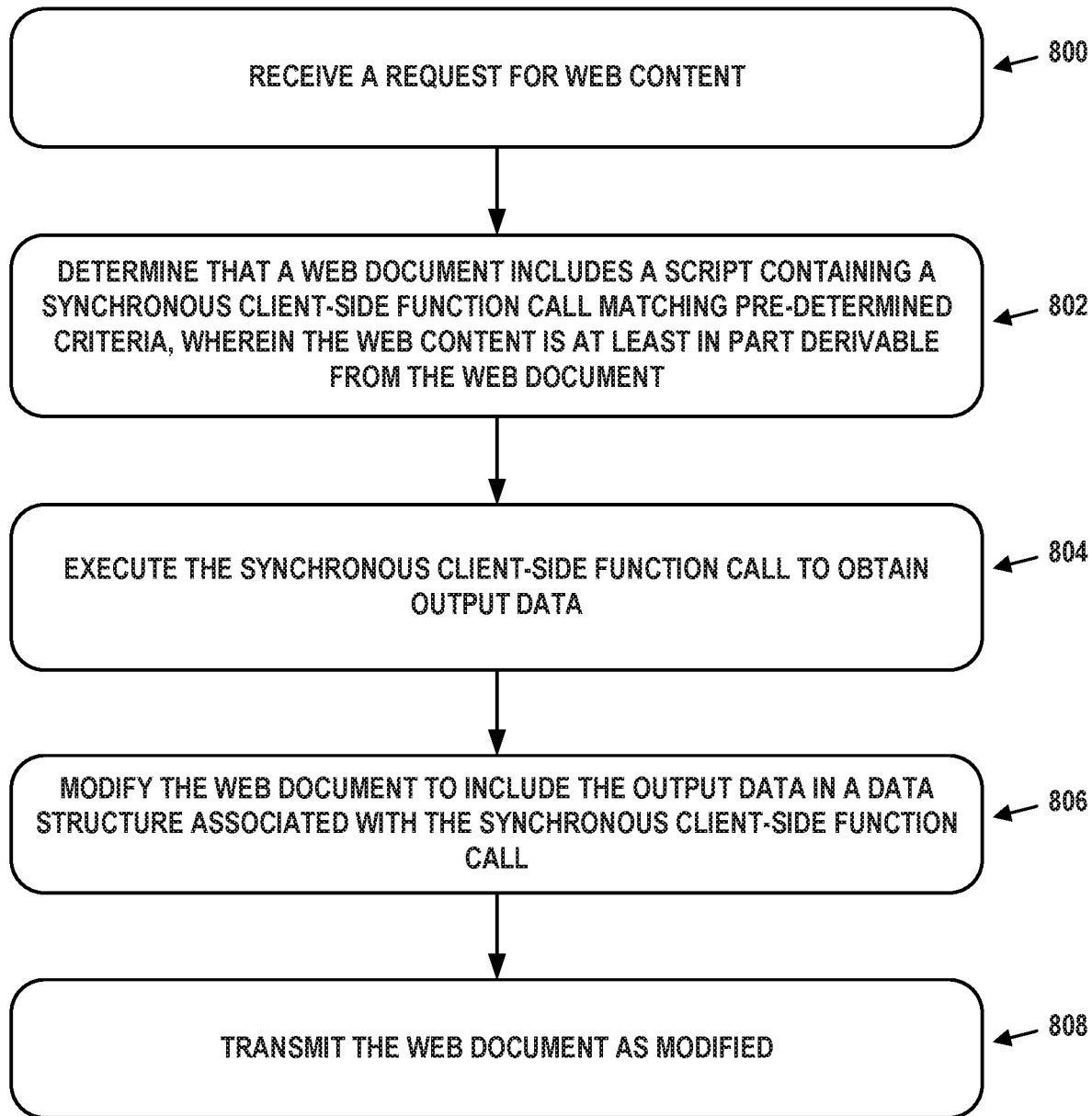
FIG. 8 is a flow chart, in accordance with example embodiments.
Figure 9:
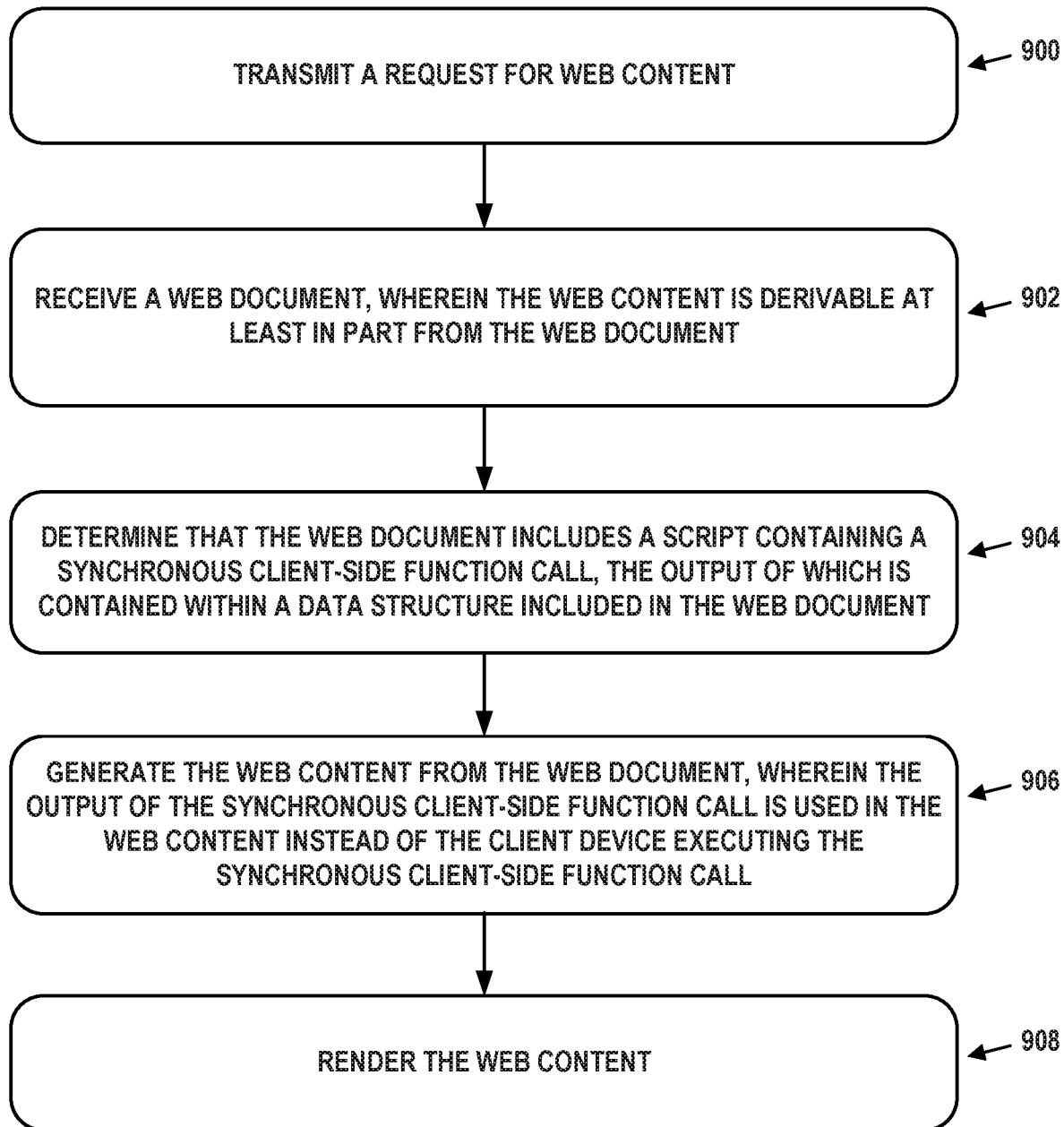
FIG. 9 is a flow chart, in accordance with example embodiments.

FIGS. 8 and 9 are flow charts illustrating example embodiments. The processes illustrated by FIGS. 8 and 9 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 8 and 9 may be simplified by the removal of any one or more of the features shown therein. Further, these embodiments may be combined with features, aspects, and/or implementations of any of the previous figures or otherwise described herein.

FIG. 8 illustrates embodiments from the perspective of a web server device. Accordingly, block 800 may involve receiving, from a client device, a request for web content. The request for web content may identify a URL associated with a web document. The web content may be at least in part derivable from the web document. The web document may be in a HTML format.

Block 802 may involve, possibly in response to receiving the request for the web content, determining that the web document includes a script containing a synchronous client-side function call matching pre-determined criteria. The pre-determined criteria may be that the synchronous client-side function call has a particular name. Alternatively or additionally, the pre-determined criteria may be that the synchronous client-side function call represents a request for data by way of the web server device.

Block 804 may involve executing the synchronous client-side function call to obtain output data. Executing the synchronous client-side function call to obtain the output data may involve requesting and receiving the output data from a database device and/or retrieving the output data from a filesystem of the web server device.

Block 806 may involve modifying the web document to include the output data in a data structure associated with the synchronous client-side function call. This modifying of the web document may involve appending the data structure to the beginning or end of the web document, or anywhere else within the web document. Particularly, the data structure may be an array of content, and the modifying the web document may involve placing the output data at a particular location within the data structure. The particular location may be referenced by the synchronous client-side function call (e.g., as a parameter passed into the function call).

Block 808 may involve transmitting, to the client device, the web document as modified. Reception of the web document as modified may cause the client device to render, on a display unit of the client device, the web content based on the web document as modified without carrying out the synchronous client-side function call to retrieve the output data from the web server device.

FIG. 9 illustrates embodiments from the perspective of a client device. Accordingly, block 900 may involve transmitting, to a web server device, a request for web content. The request for web content may identify a URL associated with a web document. The web content may be derivable at least in part from the web document. The web document may be in an HTML format.

Block 902 may involve receiving, from the web server device, the web document. Block 904 may involve determining that the web document includes a script containing a synchronous client-side function call, the output of which is contained within a data structure included in the web document. The data structure may be appended to the beginning or end of the web document, or anywhere else within the web document.

Block 906 may involve generating the web content from the web document. The output of the synchronous client-side function call may be used in the web content instead of the client device executing the synchronous client-side function call. The data structure may be an array of content. Thus, generating the web content from the web document may involve using the index to locate the output data in the array, and representing the output data in the web content.

Block 908 may involve rendering, on a display unit of the client device, the web content. The web content may be in the form of a web page. In some embodiments, once the web page is fully rendered, the client device may delete or otherwise invalidate the output data.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising steps performed in the following order:
   receiving, by a web server device from a client device, a request for web content;
   in response to receiving the request for the web content, scanning, by the web server device, a web document to determine that the web document includes any scripts comprising any synchronous client-side function calls configured to cause the client device to send subsequent requests, via the synchronous client-side function calls, for data from the web server device after the web document is sent to the client device, wherein the web content is at least in part derivable from the web document;
   executing, by the web server device, the synchronous client-side function calls to obtain output data by using an assignment in place of sending the subsequent requests;
   modifying, by the web server device, the web document to include the output data in a data structure associated with the synchronous client-side function calls, wherein the data structure comprises an array of content, wherein the assignment is invalidated in response to the web document being modified to include the output data to limit future synchronous calls from obtaining non-relevant information, and wherein the invalidation occurs after expiration of a time period from completion of rendering activity, and wherein modifying the web document comprises:
   appending the data structure to the web document; and
   placing the output data at a particular location within the data structure, wherein the particular location is referenced by the synchronous client-side function calls; and
   transmitting, by the web server device to the client device, the web document after the web document has been modified based at least in part on the scanning of the web document.

2. The method of claim 1, wherein the request for web content identifies a uniform resource locator associated with the web document.

3. The method of claim 1, wherein the determination that the web document includes any scripts comprising any synchronous client-side function calls configured to cause the client device to send the subsequent requests comprises determining that the synchronous client-side function calls comprise a particular name.

4. The method of claim 1, wherein the determination that the web document includes any scripts comprising any synchronous client-side function calls configured to cause the client device to send the subsequent requests comprises determining that the synchronous client-side function calls comprise a request for data by way of the web server device.

5. The method of claim 1, wherein the web document is in a HyperText Markup Language format.

6. The method of claim 1, wherein executing the synchronous client-side function calls to obtain the output data comprises requesting and receiving the output data from a database device.

7. The method of claim 1, wherein executing the synchronous client-side function calls to obtain the output data comprises retrieving the output data from a file system of the web server device.

8. The method of claim 1, wherein reception of the web document as modified causes the client device to render, on a display unit of the client device, the web content based on the web document as modified without carrying out the synchronous client-side function calls to retrieve the output data from the web server device.

9. A method comprising steps performed in the following order:
   transmitting, by a client device to a web server device, a request for web content;
   receiving, by the client device from the web server device, a web document modified by the web server device using an assignment in place of sending subsequent requests, via synchronous client-side function calls, for data from the web server device after the web document is received by the client device, wherein the web content is derivable at least in part from the web document;
   determining, by the client device, that the web document includes a script containing the synchronous client-side function calls configured to cause the client device to send the subsequent requests, wherein an output of the synchronous client-side function calls is within a data structure in the web document so that the client device does not transmit the subsequent requests, wherein the data structure comprises an array of content, wherein the output is received from the web server device due to the web server device pre-scanning the web document before sending the web document to the client device, and wherein the assignment is invalidated in response to the web document being modified to include the output to limit future synchronous calls from obtaining non-relevant information, and wherein the invalidation occurs after expiration of a time period from completion of rendering activity, and wherein modifying the web document comprises:
   appending the data structure to the web document; and
   placing the output at a particular location within the data structure, wherein the particular location is referenced by the synchronous client-side function calls;
   generating, by the client device, the web content from the web document, wherein the output of the synchronous client-side function calls is used in the web content instead of the client device executing the synchronous client-side function calls due to the pre-scanning of the web document by the web server device; and
   rendering, by the client device on a display unit of the client device, the web content.

10. The method of claim 9, wherein the data structure is appended to a beginning or an end of the web document.

11. The method of claim 9, wherein the data structure comprises the output of the synchronous client-side function calls stored at an index into the array, and wherein generating the web content from the web document comprises:
   using the index to locate the output in the array; and
   representing the output in the web content.

12. The method of claim 9, wherein the request for web content identifies a uniform resource locator associated with the web document.

13. The method of claim 9, wherein the web document is in a HyperText Markup Language format.

14. A computing system comprising:
   one or more processors: memory storing web content; and
   program instructions, stored in the memory, that upon execution by the one or more processors cause the computing system to perform operations comprising steps performed in the following order:
   receiving, from a client device, a request for the web content; in response to receiving the request for the web content, scanning a web document to determine that the web document comprises any scripts containing synchronous client-side function calls configured to cause the client device to send subsequent requests, via the synchronous client-side function calls, for data after the web document is sent to the client device, wherein the web content is at least in part derivable from the web document;

executing the synchronous client-side function calls to obtain output data by using an assignment in place sending the subsequent requests;

modifying the web document to include the output data in a data structure associated with the synchronous client-side function calls, wherein the data structure comprises an array of content, wherein the assignment is invalidated in response to the web document being modified to include the output data to limit future synchronous calls from obtaining non-relevant information, and wherein the invalidation occurs after expiration of a time period from completion of rendering activity, and wherein modifying the web document comprises:

appending the data structure to the web document; and placing the output data at a particular location within the data structure, wherein the particular location is referenced by the synchronous client-side function calls; and transmitting, to the client device, the web document after the web document has been modified based at least in part on the scanning of the web document.

15. The computing system of claim 14, wherein the determination that the web document includes any scripts comprising any synchronous client-side function calls configured to cause the client device to send the subsequent requests comprises determining that the synchronous client-side function calls comprise a particular name.

16. The computing system of claim 14, wherein the determination that the web document includes any scripts comprising any synchronous client-side function calls configured to cause the client device to send the subsequent requests comprises determining that the synchronous client-side function calls comprise a request for data by way of the one or more processors executing the program instructions.

17. The computing system of claim 14, wherein appending the data structure to the web document comprises appending the data structure to the beginning or end of the web document.

18. The method of claim 1, wherein appending the data structure to the web document comprises appending the data structure to a beginning or an end of the web document.

19. The method of claim 1, wherein the time period is at least one of seconds or minutes.

20. The computing system of claim 14, wherein the time period is at least one of seconds or minutes.

* * * * *